United States Patent [19]

Baxter et al.

[11] Patent Number: 4,951,213
[45] Date of Patent: Aug. 21, 1990

[54] VEHICLE NAVIGATION

[75] Inventors: Ivor R. Baxter, Shenfield; Thomas Hair, Chelmsford, both of United Kingdom

[73] Assignee: The General Electric Company, plc, London, England

[21] Appl. No.: 302,632

[22] Filed: Jan. 27, 1989

[51] Int. Cl.⁵ .............................................. G06F 15/00
[52] U.S. Cl. ...................................... 364/456; 364/449; 364/443
[58] Field of Search ............... 364/449, 453, 456, 565; 340/988; 356/2, 51, 398; 342/450, 451; 250/334

[56] References Cited

U.S. PATENT DOCUMENTS

| | | | |
|---|---|---|---|
| 3,476,921 | 8/1964 | Jones et al. | 342/451 |
| 4,402,049 | 8/1983 | Gray | 364/456 |
| 4,495,589 | 1/1985 | Hirzel | 364/565 |
| 4,533,918 | 8/1985 | Virnot | 364/456 |
| 4,823,271 | 4/1989 | Clark et al. | 364/456 |
| 4,866,626 | 9/1989 | Egli | 364/449 |

FOREIGN PATENT DOCUMENTS

| | | |
|---|---|---|
| 2041689 | 9/1980 | United Kingdom . |
| 2060306 | 4/1981 | United Kingdom ................ 364/456 |

Primary Examiner—Parshotam S. Lall
Assistant Examiner—Michael Zanelli
Attorney, Agent, or Firm—Spencer & Frank

[57] ABSTRACT

An aircraft navigation system uses an infra-red scanner to provide an image of the ground, and a laser doppler system to measure the speed of the aircraft relative to the ground. The apparent movement relative to the aircraft of features in the image is extrapolated to find the point in the image at which this movement converges. This point corresponds to the direction in which the aircraft is moving. Knowing the original position, the direction and motion of the aircraft, its new position can be calculated.

17 Claims, 2 Drawing Sheets

VEHICLE NAVIGATION

BACKGROUND OF THE INVENTION

1. Field of the Invention

This invention relates to vehicle navigation systems especially those for low-flying aircraft.

2. Description of the Prior Art

At present, self contained systems for finding the position of an aircraft fall into two main types: inertial navigation systems and radar systems.

Inertial navigation systems operate by using accelerometers arranged to sense the aircraft's acceleration along three orthogonal axes. These accelerations are then integrated to provide a measure of the aircraft's velocity and displacement from its starting position.

Radar systems operate by transmitting radar signals to the terrain around the vehicle and then using the reflected signals to produce a map of this terrain. This map is then compared with a pre-recorded map of the area and the aircraft position is taken to be the one at which the two maps correspond most closely.

Radar systems have the disadvantage that they require the aircraft to transmit radar signals, which can of course be picked up by anyone with a suitable receiver: in military aircraft this is of course highly undesirable.

Both systems have the problem that they are heavy and expensive. In aircraft generally and especially in remotely piloted aircraft weight is very important because the aircraft payload is limited.

BRIEF SUMMARY OF THE INVENTION

This invention provides a method of measuring vehicle motion using an electro-magnetic radiation sensor having a field of view external to the vehicle, and distance-measuring means, including the steps of:

i. selecting a number of image points in the external field of view, ii. measuring and recording the bearings, relative to a fixed axis of the sensor, of the points at a first time, iii. measuring and recording the bearings, relative to the fixed axis of the sensor, of the points at a second time, iv. using the sets of bearings at the first and second times to calculate the apparent movement, relative to the sensor, of the points, and v. using the apparent movement of the points to calculate the direction of motion of the vehicle.

According to a further aspect, the invention provides a vehicle motion measurement system comprising an electro-magnetic radiation sensor having a field of view external to the vehicle, a distance measuring system and a computer system arranged to operate on the data produced by the sensor and the distance measuring system so as to carry out the steps of:

i. selecting a number of image points in the external field of view, ii. measuring and recording the bearings, relative to the fixed axis of the sensor of the points at a first time, iii. measuring and recording the bearings, relative to the fixed axis of the sensor, of the points at a second time, iv. using the sets of bearings at the first and second times to calculate the apparent movement, relative to the sensor, of the points, and v. using the apparent movement of the points to calculate the direction of motion of the airborne vehicle.

Many aircraft carry electro-optical sensors such as television cameras, image intensifiers or forward looking infra-red for target identification and as a landing aid. By using this invention it is possible to employ these sensors in navigation systems as well as in their normal function and thus avoid the need for space and payload weight to be allocated to a dedicated navigation system.

Preferably at least seven such points are selected because, in order to follow the position of an aircraft having six degrees of freedom, at least seven sets of track data (i.e. data defining the apparent movement of the points) are needed because the movements of the aircraft in the six degrees of freedom are independent variables, so at least seven simultaneous equations containing them, to represent the apparent movements of the points, are needed to solve them unambiguously in a plane normal to flight path.

BRIEF DESCRIPTION OF THE DRAWINGS

A navigation system employing the invention will now be described, by way of example, with reference to the accompanying figures of which.

DETAILED DESCRIPTION OF THE PREFERRED EMBODIMENT

Figure 1:
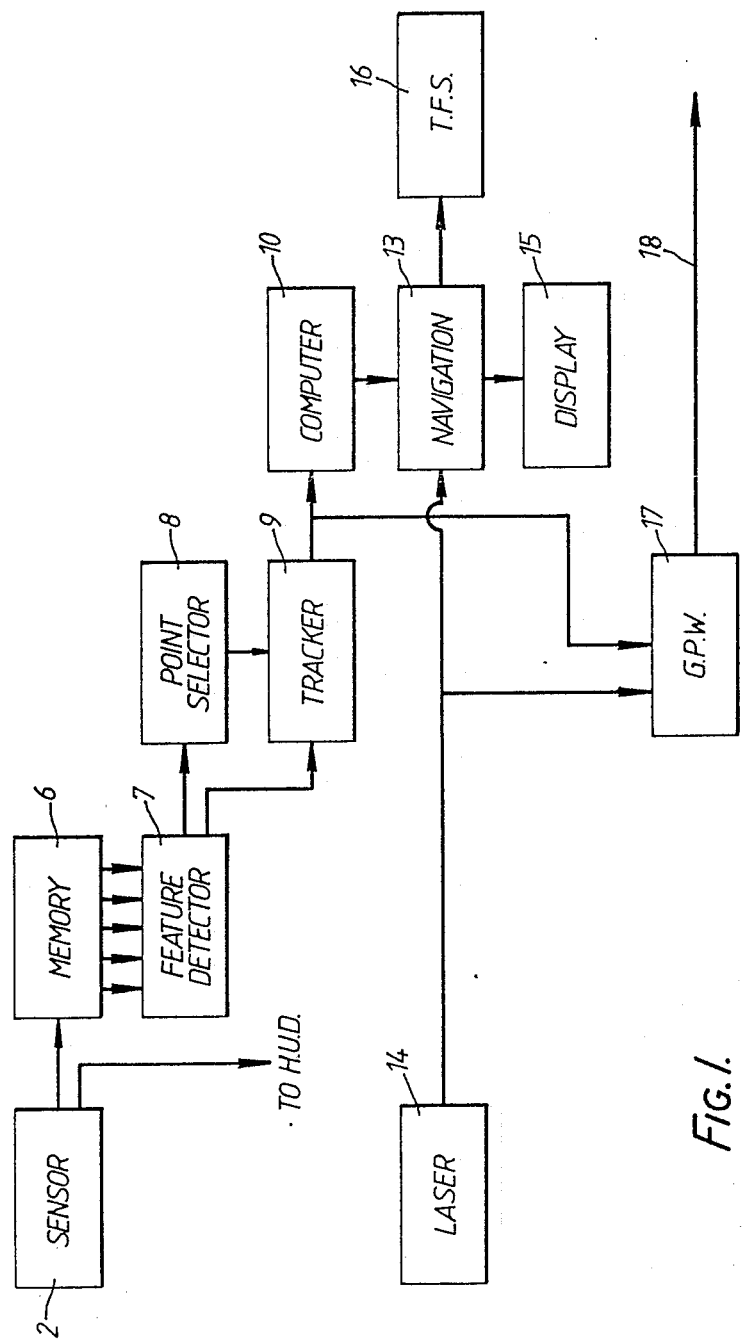
FIG. 1 shows a navigation system employing the invention, in block diagram form.
Figure 2:
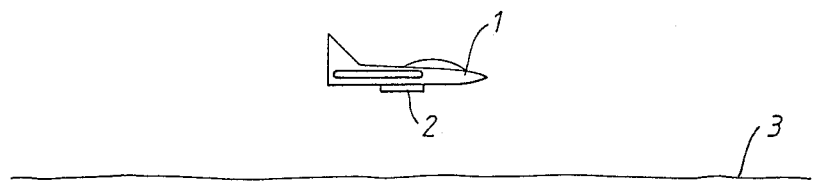
FIG. 2 shows an aircraft mounting the navigation system of FIG. 1.
Figure 3:
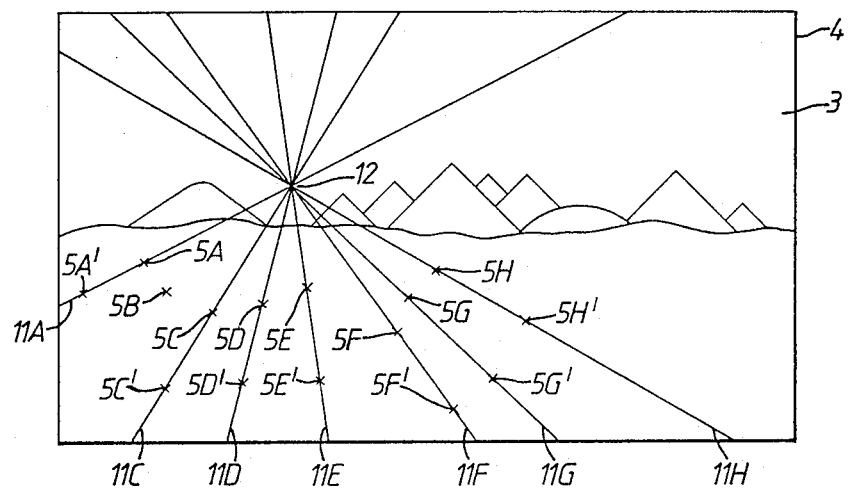
FIG. 3 shows an image produced by the system and the features in it used by the system of FIG. 1; identical parts having the same reference numerals throughout.

An aircraft 1 mounts a forward looking infra-red sensor 2, e.g. a T.I.C.M. thermal imager generating a fresh image of the frame at a frequency of 50 Hz, which sensor has a field of view including the ground 3.

The ground 3 in the field of view 4 of the infra-red sensor 2 includes a number of features 5A to 5H which stand out from their surroundings when viewed in infra-red. These points 5A to 5H stand out because of their high thermal contrast compared to their surroundings: generally they will be either heat sources, such as fires, or discontinuities in the terrain such as ponds or houses.

The infra-red sensor 2 is a scanning sensor and supplies data giving the intensity of received infra-red radiation from each pixel in the field of view 4 in sequence. This data is supplied to a pilot's head up display (not shown) and to a memory 6. The memory 6 stores the data from the sensor 2 over a full scanning cycle and then supplies this data to a feature detector 7. The feature detector 7 picks out features such as 5A to 5H having contrast to their surroundings above some preset level by a point selector 8. These features will comprise small areas of pixels having a range of intensities. The point selector 8 selects eight of these features having the highest range of intensities, in this case points 5A to 5H. The point selector 8 then supplies the data concerning each of these eight points to a tracker 9.

The tracker 9 holds the coordinates of the points 5A to 5H. Following the next cycle of the scanning sensor 2, the next set of data from the memory 6 is supplied to the feature detector 7 by the memory 6. The feature detector provides data concerning all the features in the field of view 4 meeting the criteria of the feature detector to the point selector 8 and the tracker 9.

The aircraft 1 will have moved relative to the ground 3, and as a result the position of the points 5A to 5H in the field of view 4 will alter. The tracker 9 examines the features provided by the feature detector 7 and identifies those features 5A' to 5H' which represent the new positions of the points 5A to 5H. This identification is made by selecting the feature whose intensity pattern most closely matches the intensity pattern of one of the points 5A to 5H. Only those features that are within a pre-set distance of the position of the respective points 5A to 5H are considered, this distance being the maximum distance a point in the display could appear to move between scans given the performance capabilities of the aircraft. In this case there is no new feature corresponding to the point 5B, this feature for some reason no longer being visible, or having the same high level of contrast against its surroundings, at infra-red wavelengths.

The coordinates of the sets of points 5A to 5H and 5A' to 5H' are supplied by the tracker 9 to a computer 10. The computer 10 calculates the direction of straight lines 11A to 11H passing respectively through the pairs of points 5A to 5H (excluding 5B) and 5A' to 5H', the line 11A passing through 5A and 5A', the line 11C passing through 5C and 5C' and so on.

The computer 10 calculates by extrapolation a point of intersection 12 of all of the lines 11A to 11H. It is unlikely that all of the lines 11A to 11H will in fact intersect at precisely the same point, so the point 12 is selected to be the point nearest to all of the lines using a least squares method. The position of this point in the field of view relative to the center of the field of view represents the direction in which the aircraft 1 is moving relative to the terrain 3 during the interval since the previous such computation. The computer 10 then supplies the coordinates of the point of intersection 12 to a navigation unit 13.

A laser doppler system 14 measures the speed of the aircraft 1 relative to the terrain 3, which is treated for this purpose as a fixed reference plane. This is done by transmitting a laser pulse to the terrain 3 and then receiving it and measuring the doppler shift in its frequency due to the speed of the aircraft 1 relative to the terrain 3. Such systems are well known and need not be described in detail here.

This laser transmission will not be picked up by anyone in the terrain because, unlike a terrain mapping radar, the laser beam will only illuminate a very small area of the terrain 3.

The laser doppler system 14 supplies the navigation unit 13 with the speed of the aircraft 1 relative to the terrain 3. The navigation unit 13 computes the direction in which the aircraft 1 has travelled from the coordinates of the point of intersection 12. It then computes the aircraft velocity in that direction from the speed relative to the terrain 3 and integrates this over the aircraft's entire flight (comprising many cycles of the scanning sensor) in order to calculate the position of the aircraft 1 relative to a known starting point on the terrain 3. The position and altitude of the aircraft 1 is then provided to the pilot on a visual display 15 and to a terrain following system 16. The terrain following system 16 operates by maneuvering the aircraft so as to keep the aircraft at an approximate constant height above the ground and on a pre-programmed course.

The computer 10 and laser doppler system 14 also supply positional information to a ground proximity warning unit 17. If the speed, course and position of the aircraft 1 relative to the terrain 3 go outside a range of pre-set limits, the ground proximity warning unit 17 will send a signal along a line 18 to sound a warning to the pilot that the aircraft will hit the ground unless immediate action is taken.

Although the system has been described for use in a piloted aircraft it would also be suitable for use in a remotely controlled or autonomous air vehicle.

Although feature selector 7 has been described as selecting the features having the highest contrast to their surroundings, it would, of course, be possible to use some other criterion for selection, such as those features having the highest absolute intensity, or those which are smaller than a given apparent size.

The rate at which new sets of data are supplied to the feature selector need not be the same as the scanning rate of the infra-red sensor 2: it may be advantageous to integrate over a number of scans in order to improve the system's signal to noise ratio.

Although the invention has been described with reference to an airborne vehicle, it could easily be used in a waterborne vehicle.

We claim:

1. A method of measuring vehicle motion using an electro-magnetic radiation sensor having a field of view external to the vehicle and a distance measuring system, including the steps of:
    (a) selecting a first plurality of image points in the external field of view,
    (b) measuring and recording the bearings, relative to a fixed axis of the sensor, of the first plurality of image points at a first time,
    (c) measuring and recording the bearings, relative to the fixed axis of the sensor, of a second plurality of image points in the external field of view at a second time which respectively correspond to the first plurality of image points,
    (d) using the sets of bearings at the first and second times to calculate the apparent movement, relative to the sensor, of the second plurality of image points with respect to the corresponding ones of said first plurality of image points, and (e) using the apparent movement of the second plurality of image points relative to said first plurality of image points to calculate the direction of motion of the vehicle.

2. A method as claimed in claim 1 further comprising, between steps (c) and (d), a step of measuring and recording the distance moved by the vehicle between said first time and said second time, and an additional step (f) of calculating in which said distance moved by the vehicle and the direction of its movement calculated at step (e) are used to calculate the relative change in position of the vehicle between said first time and said second time.

3. A method as claimed in claim 2 in which in step (a) includes selecting at least seven points as said first plurality of image points.

4. A method as claimed in claim 2 in which in step (d) the apparent movement of each respective one of said second plurality of image points relative to said first plurality of image points is assumed to be along a straight line between their respective positions at said first and second times.

5. A method as claimed in claim 4 further comprising determining a point of intersection of the straight lines representing the apparent movement of each respective one of said second plurality of image points relative to said first plurality of image points, and, in said step (f), using said point of intersection of the straight lines to represent the direction of motion of the vehicle between said first time and second time.

6. A method as claimed in claim 1, additionally comprising the steps of measuring the vehicle speed and calculating the position of the vehicle from the measured speed of the vehicle, the calculated direction of motion of the vehicle, and the time interval between said first time and said second time.

7. A method as claimed in claim 2 in which the measurement of the distance moved by the vehicle is carried out by measuring the speed of the vehicle between said first time and said second time and integrating this speed over the time period elapsed between said first time and said second time.

8. A method as claimed in claim 3 in which the measurement of the distance moved by the vehicle is carried out by measuring the speed of the vehicle between said first time and said second time and integrating this speed over the time period elapsed between said first time and said second time.

9. A method as claimed in claim 1 in which said vehicle is an airborne vehicle.

10. A method as claimed in claim 1 in which said vehicle is a waterborne vehicle.

11. A vehicle motion measurement system comprising;
an electro-magnetic radiation sensor having a field of view external to the vehicle,
means for selecting a plurality of image points in the external field of view at a specified time.
a distance measuring system for measuring and recording the bearings, relative to a fixed axis of said sensor, of each of said plurality of image points selected at said given time, and
computing means for operating on the data produced by said radiation sensor and by said distance measuring system at a first time to select a first plurality of image points in said external field of view at a first time, measure and record the bearings, relative to the fixed axis of said sensor, of said first plurality of image points, said means for selecting then determining a second plurality of image points which correspond to respective ones of said first plurality of image points, said distance measuring system operating to measure and record the bearings, relative to said fixed axis of said sensor, of said second plurality of image points, said computing means operating on the bearings measured for said first plurality of image points and for said second plurality of image points at said first time and said second time to calculate the apparent movement, relative to said sensor, of said second plurality of image points relative to said first plurality of image points, and
using the apparent movement of said image points to calculate the direction of motion of the vehicle.

12. A system as claimed in claim 11 in which said computing means carries out an additional step of measuring and recording the distance moved by the vehicle and the direction of movement of the vehicle between said first time and said second time, and said computing means carries out a final step in which said distance moved by the vehicle and the direction of movement of the vehicle are used to calculate the relative change in position of the vehicle between said first and second times.

13. A system as claimed in claim 11 wherein said vehicle is an air vehicle.

14. A system as claimed in claim 11 wherein said vehicle is a waterborne vehicle.

15. A method as claimed in claim 1 wherein said means for selecting selects at least seven image points.

16. A method as claimed in claim 1 wherein said computing means determines the apparent movement of each of said second plurality of image points relative to said first plurality of image points to be along a straight line between their corresponding positions at said first time and said second time.

17. A method of measuring vehicle motion using an elector-magnetic radiation sensor having a field of view external to the vehicle, a feature selector, a point selector, a tracker, and a distance measuring system, including the steps of:
(a) using the radiation sensor to obtain a first external field of view at a first time,
(b) using the feature selector to identify a plurality of image points in the external field of view which meet predetermined criteria,
(c) using the point selector to select, from among the plurality of image points identified by said feature selector, a plurality of selected image points in the external field of view,
(d) using the tracker to measure and record the bearings of the selected image points in the first external field of view relative to a fixed axis of the sensor,
(e) using the radiation sensor to obtain a second external field of view at a second time,
(f) using the feature selector and the tracker to identify a second plurality of image points in the second external field of view which correspond to the selected image points determined in the first external field of view,
(g) using the tracker to measure and record the bearings, relative to the fixed axis of the sensor, of the second plurality of image points determined in step (f),
(h) using the set of bearings of the selected image points in the first external field of view and the bearings of the second plurality of image points in the second external field of view, which were determined at said first and second times, to calculate the apparent movement of the second plurality of image points determined at step (f) relative to the corresponding ones of the selected image points determined at step (b), and
(i) using the apparent movement of the image points to calculate the direction of motion of the vehicle.

* * * * *